United States Patent
Mazzocchi et al.

(10) Patent No.: US 9,421,933 B1
(45) Date of Patent: Aug. 23, 2016

(54) ACTIVE GLOVE BOX DOOR WITH INTERMEDIATE SKELETON MEMBER

(71) Applicant: FORD GLOBAL TECHNOLOGIES, LLC, Dearborn, MI (US)

(72) Inventors: Nicholas A. Mazzocchi, Ann Arbor, MI (US); Li Lu, Bloomfield Hills, MI (US); Sean B. West, Monroe, MI (US); Stacey H. Raines, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/691,837

(22) Filed: Apr. 21, 2015

(51) Int. Cl.
| | | |
|---|---|---|
| *B60R 21/04* | (2006.01) | |
| *B60R 21/205* | (2011.01) | |
| *B60R 21/215* | (2011.01) | |
| *B60R 21/045* | (2006.01) | |
| *B60R 7/06* | (2006.01) | |
| *B60R 21/235* | (2006.01) | |

(52) U.S. Cl.
CPC ............... *B60R 21/04* (2013.01); *B60R 7/06* (2013.01); *B60R 21/045* (2013.01); *B60R 21/205* (2013.01); *B60R 21/215* (2013.01); *B60R 2021/23519* (2013.01)

(58) Field of Classification Search
CPC ... B60R 21/04; B60R 21/045; B60R 21/205; B60R 21/215; B60R 2021/0407; B60R 2021/23519; B60R 7/06
See application file for complete search history.

(56) References Cited

U.S. PATENT DOCUMENTS

| | | | | |
|---|---|---|---|---|
| 6,761,375 B2 * | 7/2004 | Kurachi | ............. | B60R 21/2165 280/728.2 |
| 6,971,667 B2 * | 12/2005 | Enders | ................. | B60R 21/206 280/730.1 |
| 6,976,706 B2 * | 12/2005 | Smith | ................... | B60R 21/206 280/730.1 |
| 7,484,792 B2 * | 2/2009 | Penner | ..................... | B60R 7/06 280/752 |
| 7,735,865 B2 * | 6/2010 | Cappabianca | ........ | B60R 21/045 180/90 |
| 7,810,837 B2 * | 10/2010 | Thomas | ................. | B60R 21/16 280/730.1 |
| 7,810,869 B2 * | 10/2010 | Taracko | ................... | B60R 7/06 296/187.05 |
| 8,297,650 B2 * | 10/2012 | Enders | ................. | B60R 21/206 280/730.1 |
| 8,308,186 B1 | 11/2012 | Orlowsky et al. | | |
| 8,414,024 B1 * | 4/2013 | Kalisz | ..................... | B60R 21/02 280/730.1 |
| 8,459,689 B2 | 6/2013 | Roychoudhury | | |
| 8,668,238 B2 * | 3/2014 | Kuwano | ................... | B60R 7/06 224/483 |
| 8,827,307 B2 | 9/2014 | Roychoudhury et al. | | |
| 8,931,803 B2 | 1/2015 | Roychoudhury | | |
| 8,936,273 B1 * | 1/2015 | Raines | ................... | B60R 21/04 280/730.1 |
| 2008/0060537 A1 * | 3/2008 | Moes | ....................... | B41F 7/32 101/147 |
| 2011/0012329 A1 * | 1/2011 | Sekino | .................. | B60R 21/206 280/730.2 |
| 2011/0198827 A1 * | 8/2011 | Roychoudhury | ......... | B60R 7/06 280/730.2 |
| 2011/0272929 A1 * | 11/2011 | Fukawatase | ........ | B60R 21/2165 280/730.2 |
| 2012/0018987 A1 * | 1/2012 | Matsushima | ......... | B60R 21/206 280/730.2 |
| 2012/0043783 A1 * | 2/2012 | Todd | ....................... | B60J 5/042 296/187.03 |

* cited by examiner

*Primary Examiner* — Darlene P Condra
(74) *Attorney, Agent, or Firm* — Vichit Chea; MacMillan, Sobanski & Todd, LLC (57) ABSTRACT

An active glove box door is provided for a vehicle passenger compartment. A plastic-molded inner door liner forms a reaction plate. A plastic-molded front trim wall deploys toward a passenger in the passenger compartment. A plastic-molded bladder member is joined along an outer perimeter with the trim wall by a hot weld seam to form an inflatable bladder. The bladder member includes at least one substantially circumferential pleat adjacent the weld seam and a central attachment region with a plurality of attachment bosses joined to the inner door liner. A skeleton member is mounted to the inner door liner between the bladder member and the inner door liner, wherein the skeleton member has a lattice structure for reducing flexing of the inner door liner. The skeleton member has at least one aperture receiving a respective attachment boss.

11 Claims, 8 Drawing Sheets

ACTIVE GLOVE BOX DOOR WITH INTERMEDIATE SKELETON MEMBER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster mounted in a glove box door.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner bladder wall may have a pleated (i.e., accordion-like) region that straightens out during inflation.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

When incorporating an active bolster into the door for a glove box or other storage compartment, the inside back plate of the door (i.e., inner door liner) is required to act as a reaction surface or plate which must be relatively unmovable so that the inflating bladder and the front panel push outward, toward the vehicle occupant (instead of into the storage compartment). The inner door liner typically spans the opening so that the edges of the door overlap with the instrument panel or compartment frame in order to stop the door movement at a closed position.

It is desirable to fabricate the inner door liner from a moldable thermoplastic for low cost, low weight, and easy attachment to the bladder wall (e.g., by hot plate welding). One potential problem with such a construction is that it may have sufficient flexibility to bend during deployment of the bolster. Bending may in some instances cause a reduction of support for expansion of the bladder and a reduced ability to manage impact forces with the occupant. Bending needs to be limited in order to avoid submarining of the door through the door opening. The submarining can result in a partial loss of restraint force being applied toward the impacting body.

For aesthetic and functional reasons, the exterior side of the inner door liner should be smooth and without visible imperfections. For added strength to reduce bending, internally-projecting ribs have been integrally formed on the internal surface of the inner door liner when the liner is injection molded. However, the size of such rib features are limited by the injection molding process. Unless the ribs are kept relatively thin, the rib structure will "read through" to the exterior side of the liner because of differential cooling of the plastic. The ability to see the rib structure from the outside of the inner door liner may be perceived as a defect or a low quality product.

SUMMARY OF THE INVENTION

In one aspect of the invention, an active glove box door is provided for a vehicle passenger compartment. A plastic-molded inner door liner forms a reaction plate. A plastic-molded front trim wall deploys toward a passenger in the passenger compartment. A plastic-molded bladder member is joined along an outer perimeter with the trim wall by a hot weld seam to form an inflatable bladder. The bladder member includes at least one substantially circumferential pleat adjacent the weld seam and a central attachment region with a plurality of attachment bosses joined to the inner door liner. A skeleton member is mounted to the inner door liner between the bladder member and the inner door liner, wherein the skeleton member has a lattice structure for reducing flexing of the inner door liner. The skeleton member has at least one aperture receiving a respective attachment boss.

DETAILED DESCRIPTION OF PREFERRED EMBODIMENTS

Figure 1:
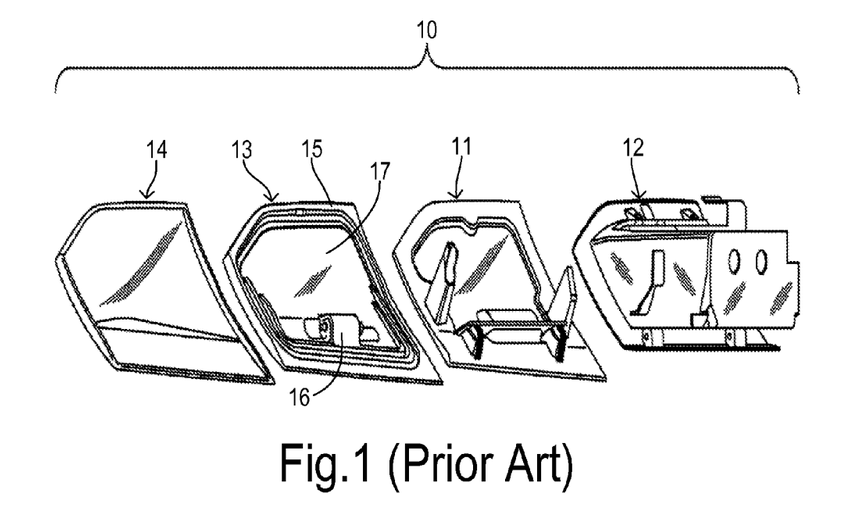
FIG. 1 is an outward-looking, exploded perspective view of a prior art active knee bolster glove box door system of a type to which the present invention can be applied.

Referring now to FIG. 1, a prior art active knee bolster system 10 has a base panel component (i.e., inner door liner) 11 which forms the foundation for the bolster. Base 11 may be either attached to the vehicle by hinging from a storage cavity or glove box 12 as shown in FIG. 1, or mounted to another structure such as an instrument panel support located below a steering column, for example. Such locations are accessible to the knees of an individual passenger riding in a corresponding seating position within a vehicle.

In this arrangement, base 11 is a inner door wall or liner that acts as a reaction surface or plate for supporting an inflatable bladder formed by a bladder member or wall 13 and a trim panel or wall 14 that are joined around their periphery 15. Walls 13 and 14 are preferably comprised of molded plastics (such as thermoplastic polyolefin (TPO)) and are joined by plastic hot welding, such as hot plate or vibration welding, to form a peripheral seal around a central region 17 for forming an inflatable bladder. An inflation gas source 16 is electronically controlled for activating during a crash to release gas to inflate the bolster. Front wall 14 may comprise the Class A interior trim surface such as the outside of the glove box door, or an additional skin or cover (not shown) can be applied to its outer surface.

Figure 2:
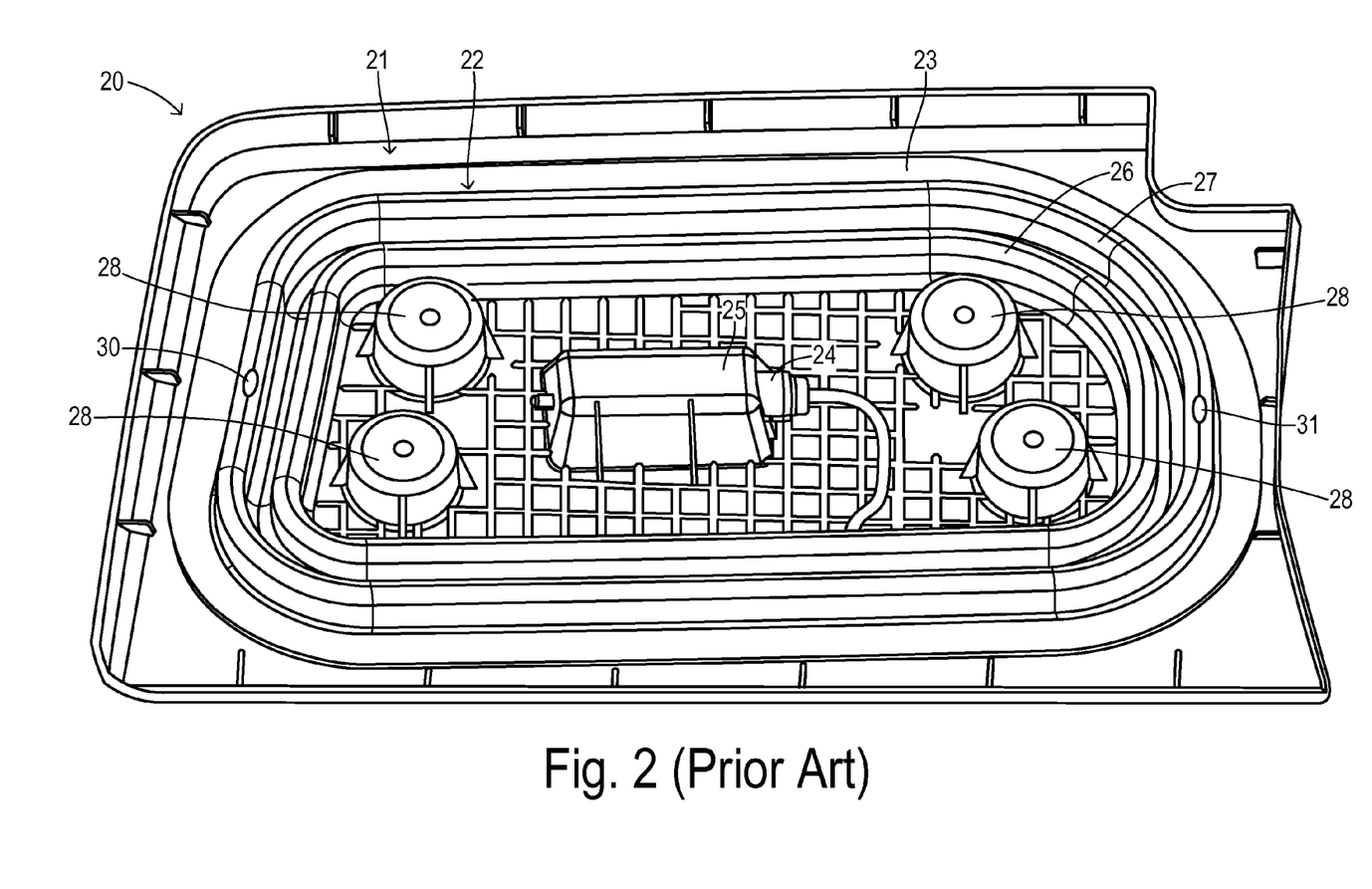
FIG. 2 is a rear perspective view of an inflatable bladder assembly of an active bolster.

FIG. 2 is a rear view of another embodiment for an inflatable bladder 20. A plastic-molded trim panel 21 overlies a plastic-molded, expandable back wall or bladder member 22. Panel 21 and bladder member 22 are joined around a closed perimeter region by hot welding a flange 23 to an inside surface of trim wall 21 in order to form an inflatable bladder having an open central volume between wall 21 and bladder member 22 to receive an inflation gas from an inflator 24 mounted in a recess 25 of bladder member 22 during a crash event. Bladder member 22 includes a plurality of pleats, such as 26 and 27, to accommodate the expansion of bladder member 22 during inflation. Pleat 27 is an outermost pleat which is adjacent to welding flange 23. A plurality of attachment towers (i.e., bosses) 28 project from a central region of bladder member 22 disposed within pleats 26 and 27. Towers 28 are used to mount bladder member 22 to a reaction plate such as an inner door liner (not shown). A pair of vent holes 30 and 31 penetrate through bladder member 22 at a peak of outermost pleat 27.

Figure 3:
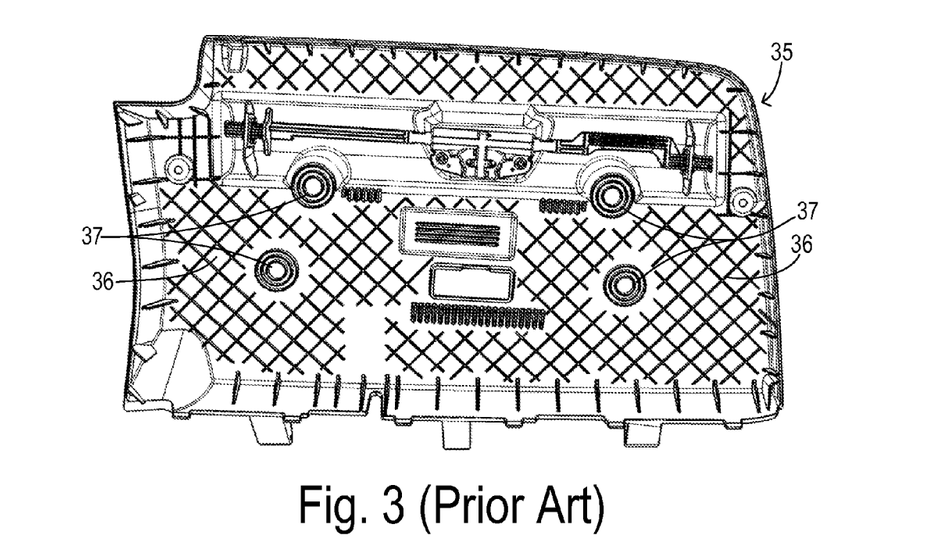
FIG. 3 is a plan view of the internal side of a inner door liner according to one prior art embodiment.

FIG. 3 is an interior view of a prior art inner door liner 35. Welding pads 37 are provided for hot welding to the welding bosses on the bladder member. A plurality of strengthening ribs 36 crisscross over much of the interior side of liner 35 to reduce flexibility. However, it has been difficult to limit bending by a sufficient amount because ribs 36 must be sufficiently thing to avoid read-through of the ribs onto the exterior side of liner 35 (not shown).

Figure 4:
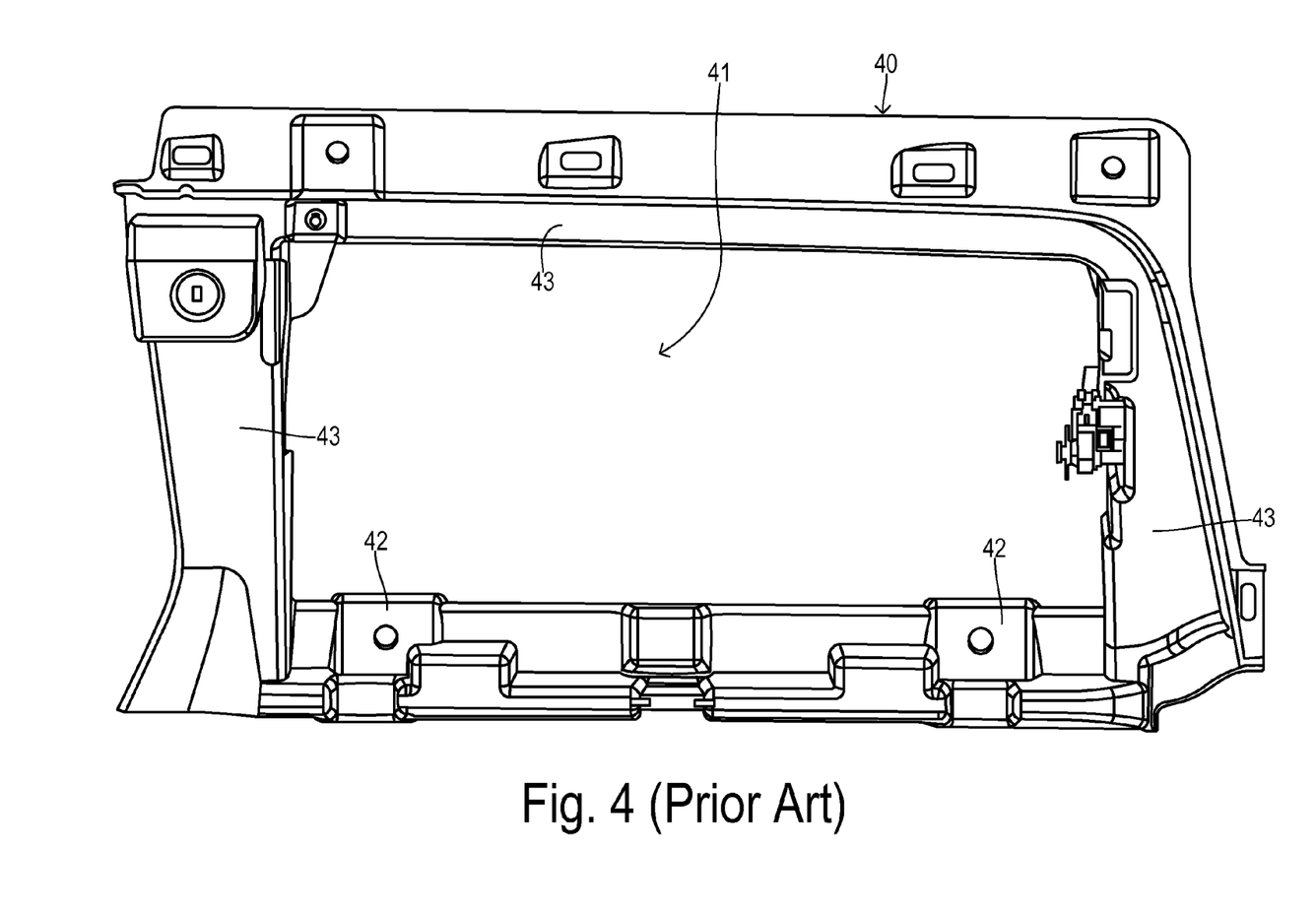
FIG. 4 is a front, plan view of a surround panel providing a door opening and for mounting the glove box door.

FIG. 4 shows an instrument panel surround 40 which is attached to an instrument panel or dashboard (not shown) to provide a frame for receiving the glove box with an opening 41 for the glove box door. Mounting pads 42 receive hinges (not shown) for pivotably attaching the glove box door. Door stop surfaces 43 are located around door opening 41. The inner door liner spans opening 41 so that surfaces 43 provide a backstop for the door to transfer forces pushing on the inner door liner through surround 40 and other instrument panel structures and a cross car beam into the vehicle body/frame.

Figure 5:
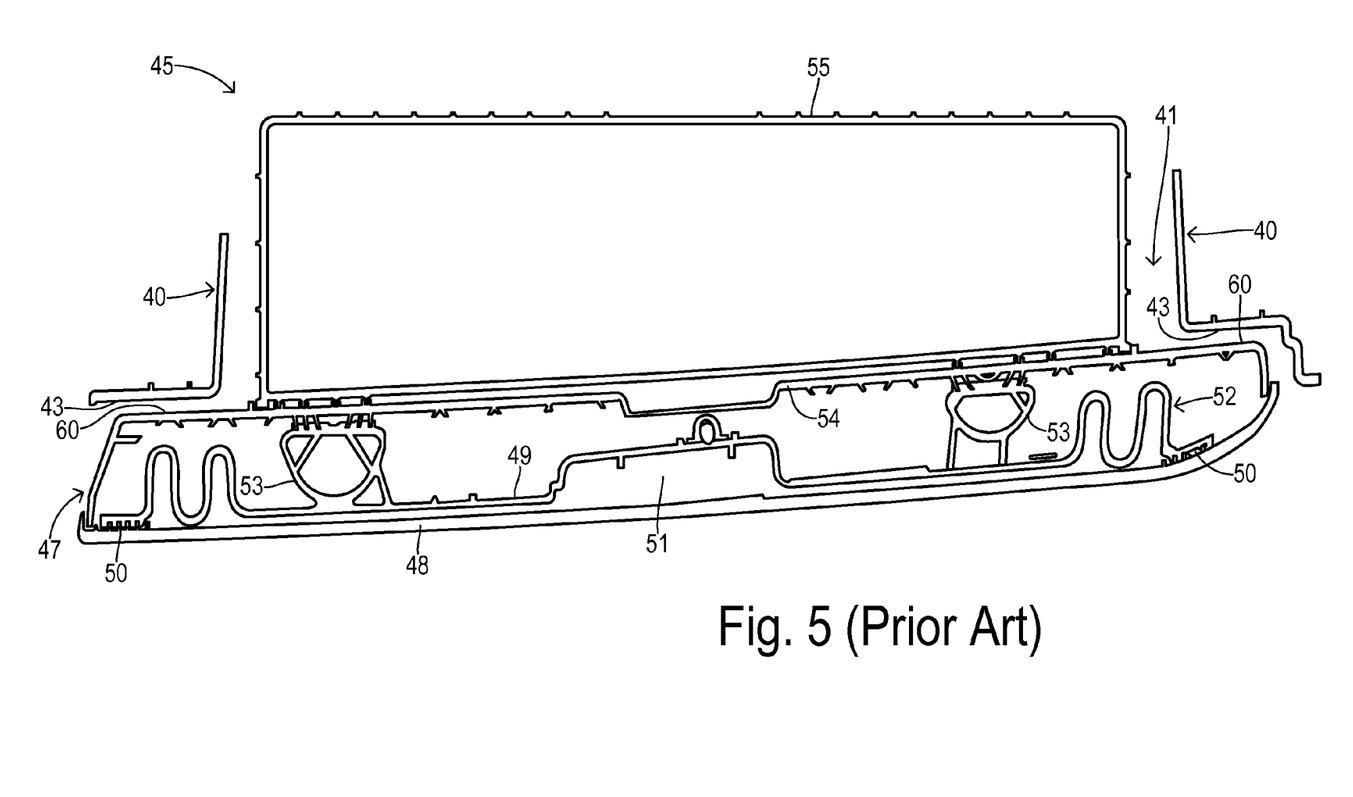
FIG. 5 is a horizontal cross-sectional view of a prior art embodiment of an active glove box system in a pre-deployment condition.
Figure 6:
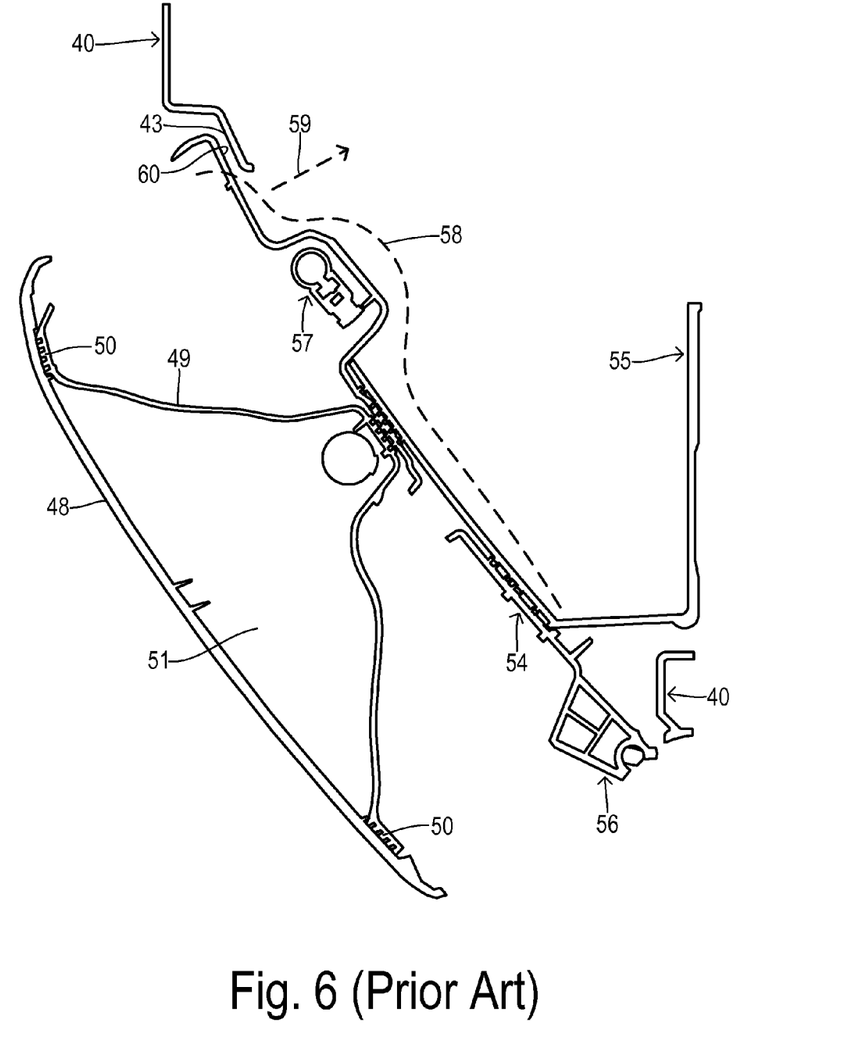
FIG. 6 is a vertical cross-sectional view of the active glove box system of FIG. 5 during inflation.

Referring now to FIGS. 5 and 6, an active glove box system 45 is mounted within opening 41 of frame surround 40. Active glove box door 47 forms an active knee bolster wherein a front trim panel 48 is attached to a bladder member 49 along an outer peripheral seal 50 along the outer peripheral edge of panel 48 and bladder member 49. An inflatable cavity 51 is formed between panel 48 and bladder member 49 which is capable of expansion toward the interior of a passenger compartment and toward an occupant (not shown) of the vehicle by virtue of the unfolding of a plurality of pleats 52 disposed annularly around bladder member 49 adjacent to peripheral seal 50. Bladder member 49 includes a plurality of bosses or welding towers 53 which are connected to an inner door liner (reaction plate) 54, which may be generally cup-shaped for nesting behind trim panel 48 prior to deployment. A storage bin 55 is attached to a central portion of the exterior side of inner door liner 54, e.g., by hot welding. By pivoting door 47 around a hinge 56 at its lower edge, bin 55 is accessed for use as a storage compartment.

To limit the rotation of door 47 when being placed in its closed position, frame 40 includes stop surfaces 43 disposed at least along the top and lateral sides of door opening 41. Inner door liner 54 has an outer fringe surface 60 which is abuttingly received by stop surfaces 43 when door 47 is closed.

Door 37 can be firmly latched at the closed position using a latch 57. In addition, deployment and impact forces of the active knee bolster are transmitted via the interface between fringe surface 60 and stop surfaces 43 when the bolster is inflated during a crash event.

FIG. 6 shows deployment of the active bolster caused by inflating chamber 51 with gas from an inflator 57. If inner door liner 54 is relatively stable, trim panel 48 moves forward during deployment. Since the preferred material to form inner door liner 54 is a moldable thermoplastic, some bending tends to occur during employment as shown along dashed line 58. Bulging results in the sliding of outer fringe 60 along the interface with stop surfaces 43 which can potentially result in submarining along arrow 59. The submarining tends to occur along the lateral sides and top of the door due to the flexing of liner 54.

Figure 7:
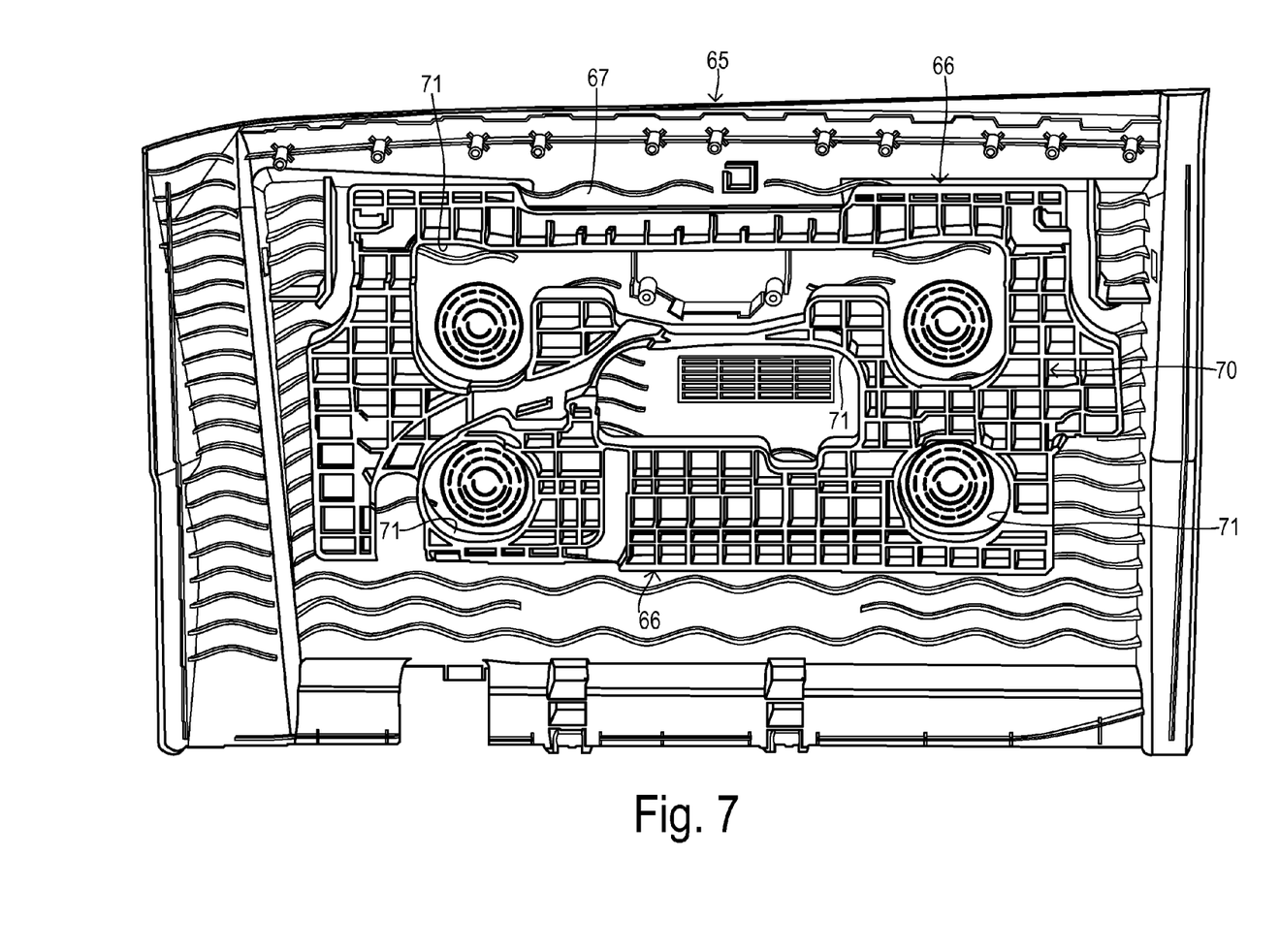
FIG. 7 is a plan view of the internal side of a inner door liner with a skeleton member according to one preferred embodiment.
Figure 8:
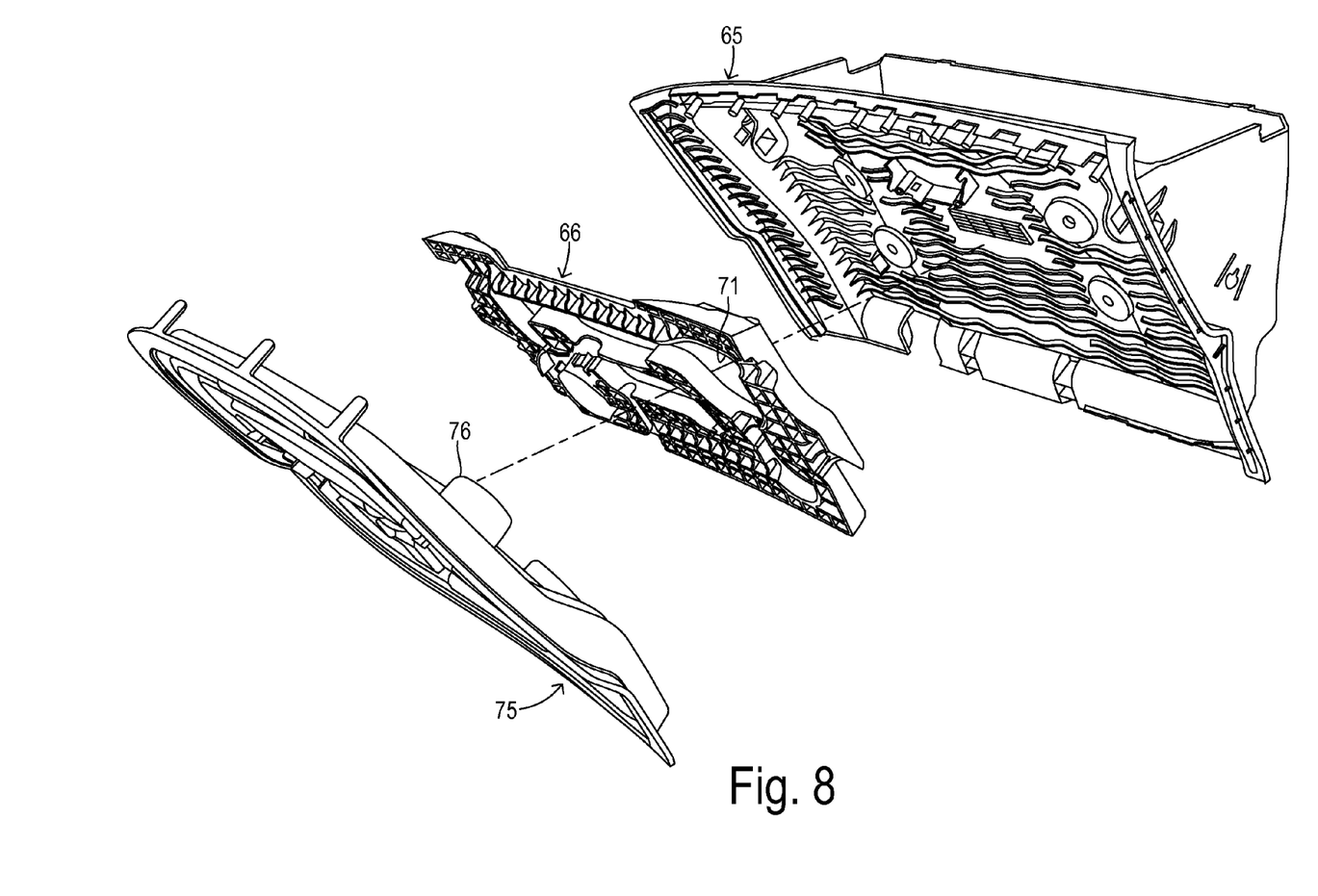
FIG. 8 is an exploded view of a glove box door showing an inner door liner, a skeleton member, and a bladder member.

To reduce flexibility of the inner door liner, the invention adds a skeleton member to the interior side of the inner door liner between the bladder member and inner door liner that functions to reinforce the liner and to directly contact expanding portions of the bladder member to better manage the energy load. As shown in FIG. 7, inner door liner 65 has a skeleton member 66 mounted to an internal surface 67, e.g., by hot welding. Skeleton number 66 has a lattice structure 70 that reduces flexing of the combined inner door liner 65 and skeleton member 66. Skeleton number 66 has at least one aperture 71 for receiving a respective attachment boss, thereby allowing the bladder member to be hot welded to inner door liner 65 as shown in FIG. 8 wherein a bladder number 75 has an attachment boss 76 that extends through aperture 71. According to one preferred assembly method, skeleton member 66 is first hot welded to inner door liner 65. Then, bladder member 75 is hot welded with inner door liner 65 through apertures 71. Additional hot weld points may optionally exist between bladder member 75 and skeleton number 66, especially in the central region between attachment process to improve the force management.

Figure 9:
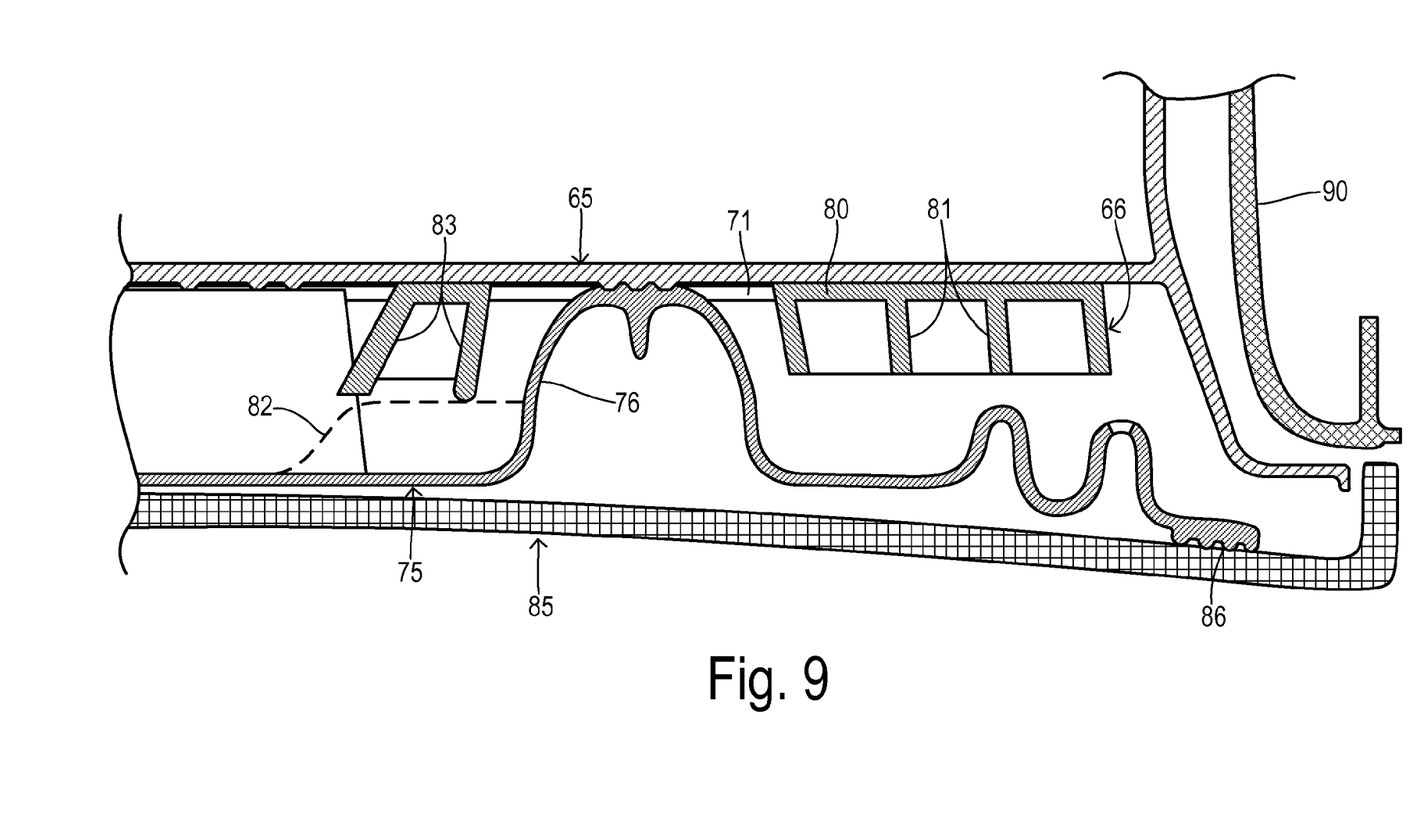
FIG. 9 is a horizontal cross section of a glove box door assembly including an inner door liner, skeleton member, bladder member, trim panel, and door frame or surround.

Skeleton member 66 is preferably comprised of a generally flat, plastic injection-molded plate 80 with raised ribs 81 projecting from plate 80 toward bladder member 75 as shown in FIG. 9. Plate 71 is hot welded to inner door liner 65, and plate 71 or liner 65 may optionally include small ribbed features for enhancing penetration of the hot weld. Raised ribs 81 can have an increased thickness since any read-through occurring on plate 80 would not seen in the final assembly.

Bladder member 75 can be modified according to an extension line 82 to interface directly with ribs 83 of skeleton member 66. When bladder member 75 is hot welded to inner door liner 65, extension 82 and ribs 83 can also be hot welded to provide direct attachment between skeleton member 66 and bladder member 75. When bladder member 75 is hot welded to inner door liner 65, it will typically have already been hot welded with a trim panel 85 along a weld seam 86.

A surround frame 90 is shown in FIG. 9 for receiving the active glove box door assembly. With the added rigidity of skeleton member 66, it becomes unnecessary for skeleton number 66 to span the door opening defined by surround 90. In an alternative embodiment, the door assembly may be reconfigured and/or an additional surface provided on surround frame 90 (e.g., a step) in order to arrange the skeleton member so that it spans the door opening in order to further increase the rigidity and force management.

What is claimed is:

1. An active glove box door for a vehicle passenger compartment, comprising:
   a plastic-molded inner door liner forming a reaction plate;
   a plastic-molded front trim wall for deploying toward a passenger in the passenger compartment;
   a plastic-molded bladder member joined along an outer perimeter with the trim wall by a hot weld seam to form an inflatable bladder, wherein the bladder member includes at least one substantially circumferential pleat adjacent the weld seam and a central attachment region with a plurality of attachment bosses joined to the inner door liner: and
   a skeleton member mounted to the inner door liner between the bladder member and the inner door liner, wherein the skeleton member has a lattice structure for reducing flexing of the inner door liner, and wherein the skeleton member has at least one aperture receiving a respective attachment boss.

2. The active glove box door of claim 1 wherein the skeleton member is comprised of a generally flat plate with raised ribs projecting from the plate toward the bladder member.

3. The active glove box door of claim 2 wherein the skeleton member is comprised of molded plastic.

4. The active glove box door of claim 3 wherein a hot weld joins the flat plate to the inner door liner.

5. The active glove box door of claim 1 wherein another hot weld joins the central attachment region to the skeleton member.

6. An automotive interior trim storage system comprising:
   an instrument panel frame with a surround defining a door opening; and
   a door hinged to the panel frame to occupy the door opening, wherein the door is comprised of:
      a plastic-molded inner door liner that spans the door opening to form a reaction plate;
      a plastic-molded front trim wall for deploying outward from door opening to restrain a passenger during a crash event;
      a plastic-molded bladder member joined along an outer perimeter with the trim wall by a hot weld seam to form an inflatable bladder for receiving an inflation gas triggered by the crash event, wherein the bladder member includes at least one substantially circumferential pleat adjacent the weld seam and a central attachment region with a plurality of attachment bosses joined to the inner door liner: and
      a skeleton member mounted to the inner door liner between the bladder member and the inner door liner, wherein the skeleton member has a lattice structure for reducing flexing of the inner door liner, and wherein the skeleton member has at least one aperture receiving a respective attachment boss.

7. The system of claim 6 wherein the skeleton member is comprised of a generally flat plate with raised ribs projecting from the plate toward the bladder member.

8. The system of claim 7 wherein the skeleton member is comprised of molded plastic.

9. The system of claim 8 wherein a hot weld joins the flat plate to the inner door liner.

10. The system of claim 6 wherein another hot weld joins the central attachment region to the skeleton member.

11. An active glove box door, comprising:
    a door liner forming a reaction plate;
    a bladder member including a circumferential pleat and a central attachment region with attachment bosses joined to the door liner: and
    a skeleton member mounted to the door liner facing the bladder member and having a lattice structure reducing flexing of the door liner, wherein the skeleton member has at least one aperture receiving a respective attachment boss.

* * * * *